United States Patent
Mazzara, Jr. et al.

(10) Patent No.: US 7,292,848 B2
(45) Date of Patent: Nov. 6, 2007

(54) METHOD OF ACTIVATING AN IN-VEHICLE WIRELESS COMMUNICATION DEVICE

(75) Inventors: William E. Mazzara, Jr., Drayton Plains, MI (US); Stephen C. Austin, Pacifica, CA (US); Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 828 days.

(21) Appl. No.: 10/209,014

(22) Filed: Jul. 31, 2002

(65) Prior Publication Data

US 2004/0023647 A1 Feb. 5, 2004

(51) Int. Cl.
*H04M 3/00* (2006.01)

(52) U.S. Cl. ............ 455/419; 455/418; 455/420; 455/11.1; 455/12.1; 342/457; 342/450; 342/358; 342/350

(58) Field of Classification Search .......... 455/419, 455/425, 424, 414.1, 524, 12.1, 418, 420, 455/11.1; 342/457, 450, 358, 350
See application file for complete search history.

(56) References Cited

U.S. PATENT DOCUMENTS

| | | | |
|---|---|---|---|
| 6,252,522 B1 * | 6/2001 | Hampton et al. ........... 340/905 |
| 6,393,408 B1 * | 5/2002 | Mosher et al. ............. 705/28 |
| 6,490,443 B1 * | 12/2002 | Freeny, Jr. ............... 455/406 |
| 6,591,098 B1 * | 7/2003 | Shieh et al. .............. 455/419 |
| 6,615,186 B1 * | 9/2003 | Kolls ..................... 705/26 |
| 6,686,880 B1 * | 2/2004 | Marko et al. ............. 342/457 |
| 6,701,161 B1 * | 3/2004 | Wendling ............... 455/556.1 |
| 6,879,825 B1 * | 4/2005 | Daly ..................... 455/419 |
| 2002/0065037 A1 * | 5/2002 | Messina et al. .......... 455/12.1 |
| 2002/0115436 A1 * | 8/2002 | Howell et al. ............ 455/426 |
| 2002/0197988 A1 * | 12/2002 | Hellaker ................. 455/423 |
| 2003/0103482 A1 * | 6/2003 | Van Bosch .............. 370/338 |
| 2003/0128104 A1 * | 7/2003 | Lessard et al. ........ 340/426.11 |
| 2003/0130005 A1 * | 7/2003 | Weisshaar et al. ......... 455/525 |
| 2003/0182360 A1 * | 9/2003 | Mocek et al. ............ 709/203 |
| 2003/0204290 A1 * | 10/2003 | Sadler et al. ............. 701/1 |

* cited by examiner

*Primary Examiner*—George Eng
*Assistant Examiner*—Khai Nguyen

(57) ABSTRACT

The invention provides a system and method for activating an in-vehicle wireless communication device. A mobile identification number associated with the wireless communication device is provided. A broadcast signal containing the mobile identification number and a satellite radio subscriber identifier is received at an in-vehicle satellite radio receiver. The mobile identification number is stored in the wireless communication device based on the satellite radio subscriber identifier.

21 Claims, 2 Drawing Sheets

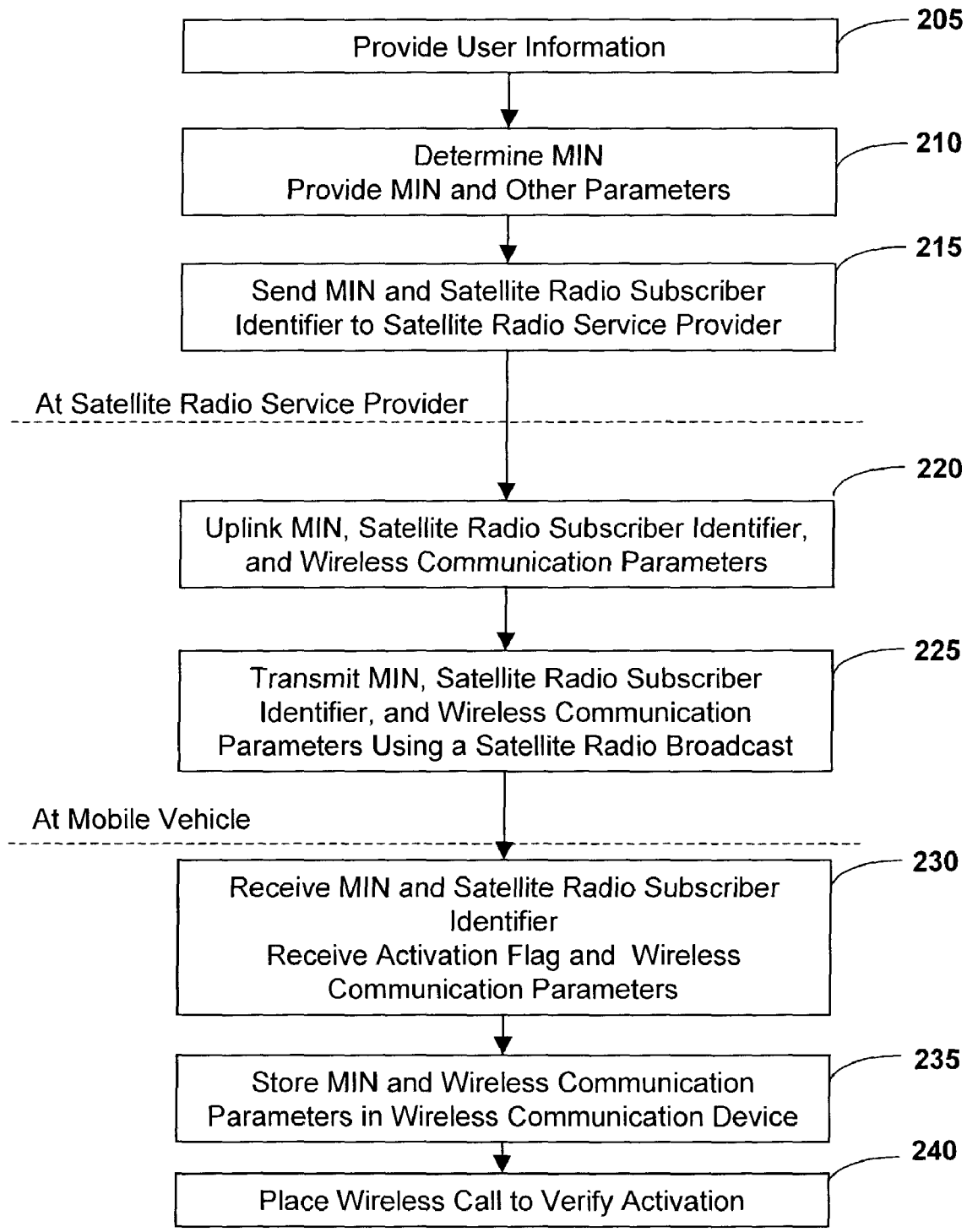

METHOD OF ACTIVATING AN IN-VEHICLE WIRELESS COMMUNICATION DEVICE

FIELD OF THE INVENTION

This invention relates generally to data transmissions over a wireless communication system. More specifically, the invention relates to a method and system for activating a wireless communication device in a mobile vehicle using a satellite-radio broadcast system.

BACKGROUND OF THE INVENTION

Wireless communication services for mobile vehicles have expanded in recent years beyond navigation and roadside assistance to services such as maintenance and diagnostic functions, system updates, vehicle position determination, unlocking of vehicle doors, or vehicle alarm setting and even personal calling services. It has been predicted that by 2006, almost all new automobiles will be equipped with some type of telematics unit or wireless communication device such as a mobile phone.

A digital wireless telephony mobile phone is typically shipped without a mobile identification number (MIN) or a geographical-specific mobile identification number (geo-MIN) programmed into the unit. The MIN is required for a local wireless telephony service provider to properly address a handset and for the mobile unit to register on the system in the home region or while roaming. Ordinarily, upon delivery and setup, the MIN is downloaded into the handset using over-the-air service provisioning (OTASP). The wireless telephony service provider must configure the mobile unit and the cellular network so that the mobile unit may be accessed using OTASP. If a phone is to be programmed without OTASP, it must be done manually. Manual programming requires knowledge on the part of the consumer or vendor representative to be able to manipulate the device and knowledge of the proper parameter values to program, and to converse with the wireless service provider for assigning appropriate MINs and MDNs (mobile directory numbers). Alternatively, when the vehicle is not in an OTASP-enabled region during the setup, configuration of the system may need to be completed after the vehicle enters an OTASP-enabled region.

There needs to be an alternative, more automated way of programming by which the device can be individually addressed and sent its MIN without requiring an OTASP-enabled wireless carrier system or configuring it manually. This alternative method may become critical for automobile dealers, telematics service providers, and wireless communication carrier systems that need to provision and program in-vehicle mobile phones in a timely manner.

The tremendous increase in the number of in-vehicle phones and growing difficulties in timely provisioning creates the need for an alternative method. The desirable method would help configure, manage, and provision mobile phones found in large fleets of vehicles such as trucks and rental cars. In some cases, mobile phones may not be provisioned immediately in fleet vehicles that have not been placed into service; in contrast, a number of vehicles in large fleets may need quick configuration or reconfiguration and a wireless communication service provider may be unable to provide timely provisioning.

Some wireless telephony service providers may not have sufficient numbers and may require several days to assign or program a new MIN. Delays of provisioning may also occur when local providers of service are not able to provision the mobile phone with a MIN, but have roaming agreements with out-of-area service providers to provide such services when the mobile phone enters their local area.

The above-mentioned delays in provisioning an in-vehicle can be avoidable with an alternative method. An alternative method should be capable of programming a wireless device of a subscriber in the event a suitable MIN is not available at the time of activation, but will be provisioned at some later time. This method may be used to trigger the subscriber device to be provisioned and would allow additional parameters specific to the wireless telephony subscriber device to be downloaded to the mobile vehicle at a later time or by using an alternative communication channel. This would allow a fourth party such as a telematics call center to coordinate the exchange of information among a retail dealer, wireless telephony service provider and a mobile vehicle.

It is an object of this invention, therefore, to provide a method for activating and provisioning an in-vehicle wireless communication device, and to overcome the deficiencies and obstacles described above.

SUMMARY OF THE INVENTION

One aspect of the invention provides a system and method for activating an in-vehicle wireless communication device. A mobile identification number associated with the wireless communication device is provided. A broadcast signal containing the mobile identification number and a satellite radio subscriber identifier is received at an in-vehicle satellite radio receiver. The mobile identification number is stored in the wireless communication device based on the satellite radio subscriber identifier. The system and method may also include sending the mobile identification number and the satellite radio subscriber identifier to a satellite radio service provider, and uplinking the mobile identification number and the satellite radio subscriber identifier to one of a geostationary satellite or a terrestrial radio transmitter of the satellite radio service provider. Another aspect of the invention includes a computer usable medium with a program to activate an in-vehicle wireless communication device.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of one embodiment of a method for activating a wireless communication device in a mobile vehicle using a satellite-radio broadcast system, in accordance with the current invention.

DETAILED DESCRIPTION OF THE PRESENTLY PREFERRED EMBODIMENTS

Figure 1:
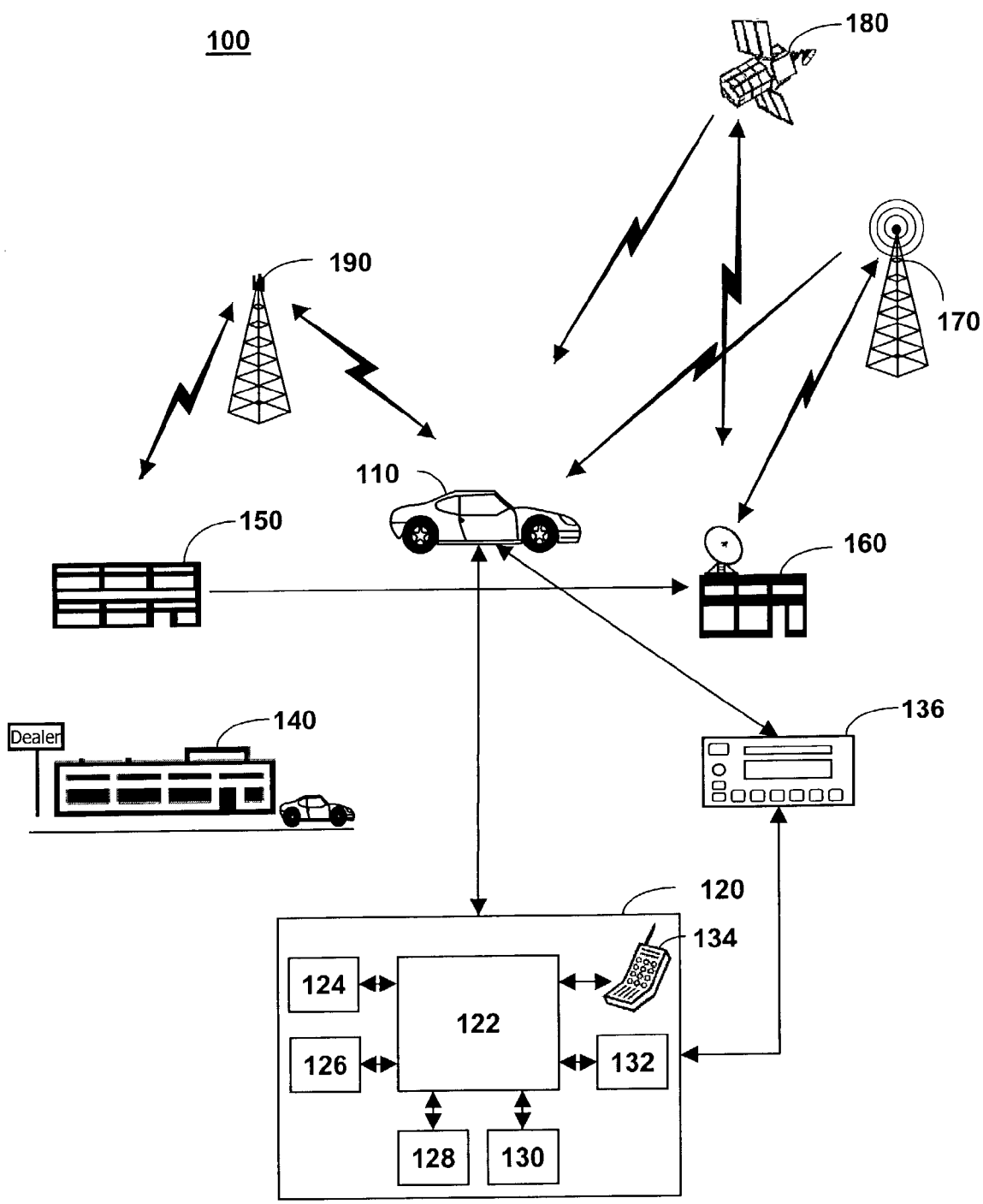
FIG. 1 is an illustration of one embodiment of a system for activating a wireless communication device in a mobile vehicle using a satellite-radio broadcast system, in accordance with the current invention.

With the present invention, a method and system that use broadcast services of a satellite radio system to activate an in-vehicle wireless communication device are available to mobile vehicles equipped with satellite radio receivers. Information broadcast on a specified channel of the satellite radio system may be monitored for vehicle-specific messages, and signals with information for activating an in-vehicle wireless communication device are extracted from the broadcast. A wireless communication device with a mobile phone may be configured with a mobile identification number (MIN) and other wireless communication parameters that are essential to the functionality of the mobile phone.

FIG. 1 illustrates one embodiment of a system for activating a wireless communication device in a mobile vehicle using a satellite-radio broadcast system, in accordance with the present invention at 100. The invention leverages the infrastructure of a satellite radio system to activate a wireless communication device in a mobile vehicle.

Activation system 100 for an in-vehicle wireless communication device may include a mobile vehicle 110, a telematics unit 120, a satellite radio receiver 136, one or more automotive dealers or vehicle transfer agents 140, one or more telematics service call centers 150, one or more satellite radio service uplink facilities 160, one or more terrestrial radio transmitters 170, one or more satellite radio service geostationary satellites 180, and one or more wireless telephony service providers 190.

Mobile vehicle 110 is a vehicle equipped with suitable hardware and software for transmitting and receiving voice and data communications. Mobile vehicle 110 may contain telematics unit 120. Telematics unit 120 may include a digital signal processor (DSP) 122 connected to a wireless analog, digital or dual-mode modem 124, a global positioning system (GPS) unit 126, an in-vehicle memory 128, a microphone 130, one or more speakers 132, and an in-vehicle mobile phone 134. In-vehicle mobile phone 134 may be an analog, digital, or dual-mode cellular phone. GPS unit 126 may provide, for example, longitude and latitude coordinates of the vehicle. The GPS system may include US-based systems, international systems, or systems operated by other entities.

DSP 122 may use instructions and data from a computer usable medium that may contain various computer programs for controlling programming and operational modes within mobile vehicle 110. Digital signals activate programming and operational modes, as well as provide input and output data. DSP 122 may direct communications between mobile phone 134 and satellite radio receiver 136, as well as communications from the telematics unit 120 through mobile phone 134.

Satellite radio receiver 136 is any suitable hardware for receiving satellite-radio broadcast signals in mobile vehicle 110. Satellite radio receiver 136 may receive digital signals from a terrestrial radio transmitter 170 or a satellite radio service geostationary satellite 180. Satellite radio receiver 136 includes a radio receiver for receiving broadcast radio information over one or more channels. Satellite radio receiver 136 may generate an audio output or provide data communications from the satellite service provider. Satellite radio receiver 136 may be separate from but electronically connected to telematics unit 120 with a cable or over the vehicle communications bus, or may be embedded within telematics unit 120. Satellite radio receiver 136 may provide channel and signal information to telematics unit 120 or directly to mobile phone 134. Telematics unit 120 may monitor, filter and send signals that are received from satellite broadcasts, radio broadcasts or other wireless communication systems to output devices such as speaker 132 and visual display devices. In one embodiment, signals from satellite radio receiver 136 may be sent directly to mobile phone 134 without the intervening telematics unit 120.

Mobile phone 134 may be integral with telematics unit 120 and coupled electronically with satellite radio receiver 136 or alternatively, mobile phone 134 may be separate and coupled electronically to telematics unit 120, as well as satellite radio receiver 136. In one embodiment, mobile vehicle 110 does not require telematics unit 120.

An automotive dealer or vehicle transfer agent 140 may help an owner or leaser of a mobile vehicle to activate mobile phone 134. The vehicle transfer agent 140 gathers vehicle and personal information necessary for a wireless communication carrier to activate mobile phone 134. The information includes, but is not limited to an owner or renter's name, home address, the unique vehicle identification number (VIN) of mobile vehicle 110, and preferred features or calling plan with wireless telephony service provider 190. The zip code of the home address may be used to determine which wireless service provider is the primary service provider for mobile vehicle 110.

In the preferred embodiment of the present invention, vehicle transfer agent 140 sends the vehicle and personal information to a telematics service call center 150, which manages telematics and personal calling services to mobile vehicle 110. In an alternative embodiment, the vehicle transfer agent 140 or driver of mobile vehicle 110 may contact wireless telephony service provider 190 directly to set up wireless communication with mobile vehicle 110. Another embodiment involves a retail dealer of systems containing a wireless communication device and a satellite radio receiver that could collect vehicle and personal information for a wireless telephony service provider 190, which assigns and configures network connections for in-vehicle mobile phone 134.

Telematics service call center 150 in communication with telematics unit 120 provides telematics services to mobile vehicle 110. These services include, but are not limited to enrollment services, navigation assistance, directory assistance, roadside assistance, business or residential assistance, information services assistance, emergency assistance, and communications assistance. Telematics service call center 150 may also manage personal calling plans negotiated with local wireless carrier providers in the home area of a driver.

Telematics service call center 150 may be a location where many calls may be received and serviced at the same time, or where many calls may be sent at the same time. The call center may prescribe communications to and from mobile vehicle 110. Telematics service call center 150 may be a voice call center, providing verbal communications between an advisor in the call center and a subscriber in a mobile vehicle. Telematics service call center 150 may contain each of these functions. Telematics service call center 150 may contain one or more switches, one or more data transmission devices, one or more communication services managers, one or more communication services databases, one or more real or virtual advisors, and one or more bus systems.

When telematics service call center 150 receives a request from a telematics subscriber that requires configuring and initiating an in-vehicle mobile phone 134, telematics service call center 150 may, after receiving a geographical mobile identification number (MIN) send the MIN, a satellite radio subscriber identifier, and wireless communication parameters to satellite radio uplink facility 160 along with a request for telematics unit 120 to call telematics service call center 150.

As part of a satellite broadcast system, a satellite radio uplink facility 160 sends and receives radio signals to a geostationary satellite 180. Satellite radio uplink facility 160 may uplink information necessary for initiating in-vehicle wireless communications from telematics service call center 150 to one or more terrestrial radio transmitters 170. Satellite radio uplink facility 160 also may send this and other radio signals to geostationary satellite 180.

Terrestrial radio transmitter 170 and geostationary satellite 180 transmits radio signals to satellite radio receiver 136 in mobile vehicle 110. Terrestrial radio transmitter 170 and geostationary satellite 180 may broadcast, for example, over a spectrum in the "S" band (2.3 GHz) that has been allocated by the U.S. Federal Communications Commission (FCC) for nationwide broadcasting of satellite-based Digital Audio Radio Service (DARS). The broadcast may be, for example, a 120 kilobyte-per-second portion of the bandwidth designated for commands signals from telematics service call center 150 to mobile vehicle 110.

Broadcast transmissions provided by a satellite radio broadcast system are sent from geostationary satellite 180 or terrestrial radio transmitter 170 to satellite radio receiver 136. In addition to music and entertainment, traffic information, road construction information, advertisements, news and information on local events, the satellite radio broadcast system may send a MIN phone number, satellite radio subscriber identifier and wireless communication parameters to satellite radio receiver 136 to initiate an in-vehicle mobile phone 134 and optionally, sends a request for in-vehicle mobile phone 134 to call telematics service call center 150. Telematics unit 120 monitors satellite radio system broadcast signals received by satellite radio receiver 136 for a signal with this information on wireless communication initiation, and when it is detected, the satellite radio identifier and associated information may be extracted from the broadcast channel. Telematics unit 120 may store or retrieve data and information from the audio signals of satellite radio receiver 136.

The signal may include a satellite radio subscriber identifier, which identifies the unique number assigned by the manufacturer of the satellite radio receiver; a MIN phone number that has been assigned to the in-vehicle mobile phone 134; and wireless communication parameters. The parameters may include a home system identifier, a mobile identification number, a call number, a preferred roaming list, a preferred roaming list flag, a configuration flag, a configuration parameter, or any combination thereof.

The signal from the satellite radio system could include a request for telematics unit 120 to call telematics service call center 150. In response, telematics unit 120 places a call with in-vehicle mobile phone 134 via wireless telephony service provider 190.

Wireless telephony service provider 190 is a wireless communications carrier. Wireless telephony service provider 190 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless telephony service provider 190 transmits to and receives signals from mobile vehicle 110, as well as connects with other communication and landline networks. Telematics service call center 150 may be connected to wireless telephony service provider 190 with a land-based network, a wireless network, or a combination of landline and wireless networks. The wireless telephony service provider 190 provisions an account and assigns a geographical MIN to in-vehicle mobile phone 134. When the wireless telephony service provider determines that the dealer or retailer is not covered by its network and cannot provision the cellular phone, a configuration flag may be set to indicate that provisioning would be completed when the vehicle is in a suitable geographical region where, for example, OTASP is available or where other over-the-air service functions can be executed.

FIG. 2 shows one embodiment of a method for activating a wireless communication device in a mobile vehicle using a satellite-radio broadcast system, in accordance with the present invention at 200. Wireless communication activation method 200 comprises steps to send wireless communication information for activating an in-vehicle mobile phone using a satellite radio broadcast service, which contains information to configure and initiate service to an in-vehicle mobile phone. The method may provide for complete provisioning, may set flags for further provisioning at a later time, or may request that an in-vehicle mobile phone calls a telematics service call center.

A vehicle transfer agent, automotive dealer or telematics service call center receives user information, as seen at block 205. User information may include the vehicle identification number (VIN) of the mobile vehicle; the serial numbers of the satellite radio receiver, mobile phone, telematics unit; and other personal information required to provision a new cellular phone connection and number.

The wireless telephony service provider is contacted to set up a new phone connection and to determine a mobile identification number (MIN), as seen at block 210. The wireless telephony service provider receives the information and provides a mobile identification number associated with the wireless communication device. The MIN determination may be done automatically or manually. A mobile directory number (MDN) may also be provided. Alternatively, a telematics service call center may be contacted as an intermediate party to work with the wireless telephony service provider to set up a new phone connection. The wireless telephony service provider assigns and associates a MIN with the wireless communication device of the mobile vehicle. The MIN determination may be based on identification numbers associated with the satellite radio receiver, the telematics unit, or the mobile vehicle. The identification numbers may include an electronic serial number associated with the wireless communication device, an electronic serial number associated with a telematics unit containing the wireless communication device, or a vehicle identification number associated with the mobile vehicle, or any combination thereof.

Once all the information is gathered, the assigned MIN, the unique number identifying the satellite radio receiver in the particular vehicle, wireless communication parameters, and any other user information necessary for activating the phone are sent to the uplink facility of the satellite radio service provider, as seen at block 215. The paired mobile identification number and the satellite radio subscriber identifier may be sent to the satellite radio service provider. A vehicle transfer agent, automotive dealer, telematics service call center or wireless telephony service provider may send information to the satellite radio uplink facility via landline or wireless links. The information may include a request for the telematics unit of the vehicle to call the call center after the in-vehicle mobile phone has been provisioned. Numbers that may be used to uniquely identify a vehicle and its wireless communication equipment include a vehicle identification number, a mobile phone identification number, an electronic serial number of the telematics unit, and a satellite radio receiver identification number associated with the satellite radio receiver.

The satellite radio uplink facility may uplink the MIN, a satellite radio subscriber identifier, and optionally, wireless communication parameters or other pertinent data to a geostationary satellite or terrestrial radio transmitter of the satellite radio service provider, as seen at block 220. A computer application at a satellite radio uplink facility may control the sending of signals and data that are received from vehicle transfer agents, automotive dealers and telematics service call centers. The satellite radio uplink facility may uplink command information to a terrestrial radio transmitter for local or metropolitan broadcasts. Satellite radio terrestrial radio transmitters may receive radio signals from a geostationary satellite, amplify the signals, and rebroadcast the signals.

Broadcast signals with the MIN, satellite radio subscriber identifier, and wireless communication parameters may be transmitted in a satellite radio broadcast from a geostationary satellite and/or a terrestrial radio transmitter of a satellite radio service, as seen at block 225. The signals may be transmitted using a predetermined broadcast channel. The signals may be transmitted, for example, over a spectrum allocated for nationwide broadcasting of satellite-based Digital Audio Radio Service (DARS). Geostationary satellite may transmit radio signals with data to a satellite radio receiver in the mobile vehicle.

A satellite radio system broadcast channel may be monitored for a command signal by a computer application running in the digital signal processor (DSP) of the telematics unit. The broadcast signal for the designated vehicle may include a satellite radio subscriber identifier, identifying the satellite radio receiver in the vehicle for which service has been requested. The satellite radio receiver receives the broadcast signal containing the satellite radio subscriber identifier and the MIN of the phone number, as seen at block 230. The broadcast signal may be received at the mobile vehicle from a geostationary satellite or a terrestrial radio transmitter of the satellite radio service. The signal may also include an activation flag, wireless communication parameters and any other data useful for activating, enabling, or provisioning the mobile phone.

From the broadcast channel, the telematics unit or a telematics-enabled mobile phone extracts the broadcast signal that has the mobile phone activation information. The broadcast channel may be monitored for particular command strings or protocol, and the signal may be extracted for further processing when a particular telematics unit identifier is ascertained. The received signal may include the mobile identification number associated with the wireless communication device, wireless communication parameters, or an activation flag that direct a telematics unit and mobile phone to activate the mobile phone with the MIN phone number at a later time or in a different place. The wireless communication parameters may be transmitted based on the activation flag using an over-the-air service protocol, an air interface function, or any suitable communication protocol. The wireless communication parameters may include a home system identifier, a mobile identification number, a call number, a preferred roaming list, a preferred roaming list flag, a configuration flag, a configuration parameter, or any combination thereof. The home system identifier is a number identifying the local calling area of a mobile phone. The mobile identification number (MIN) is used to route and track calls within a wireless network. The preferred roaming list is a list of service providers and areas of service with which the wireless telephony service provider has agreements to provide roaming service. As new agreements are made with other service providers, the wireless telephony service provider makes updates to the list. The wireless communication devices, specifically a telematics unit and a mobile phone, may be programmed with the geographical MIN and these parameters.

In one embodiment, the telematics unit calls a telematics service call center after receiving an activation flag from a satellite broadcast, after which the call center responds by sending back parameters to fully provision the mobile phone.

One process of fully provisioning wireless communication service with a mobile vehicle utilizes over-the-air service provisioning (OTASP) specified in TIA/EIA/IS-683-A (1998), "Over-the-Air Service Provisioning of Mobile Stations in Spread Spectrum Systems." In another process, short message service (SMS) communications may be sent and received according to established protocols such as IS-637 standards for SMS, IS-136 air interface standards for SMS, and GSM 03.40 and 09.02 standards. These protocols allow, for example, short messages comprised of up to 160 alphanumeric characters and do not contain images or graphics. Similar to paging, an SMS communication may be sent to the wireless communication device in mobile vehicle with one or more wireless communication parameters. In another process, over-the-air functions such as AIF (air interface function) may be used to transfer data to and from the mobile phone.

The MIN phone number and any wireless communication parameters that may have been sent by the radio broadcast system or the telematics service call center may be stored in the wireless communication device, which may be the telematics unit, a mobile phone, or a mobile phone embedded in the telematics unit, as seen at block 235.

The mobile phone may place a wireless call, with the help of the telematics unit, to a wireless service provider or a call center to verify activation of the wireless communication device, as seen at block 240.

In the event that a suitable MIN is not available at the time of activation and will be provided at some later time, a telematics service call center may send the minimal information on the mobile vehicle, telematics unit, and telematics subscriber without additional wireless communication parameters to a radio satellite system. A satellite or terrestrial transmitter of the radio satellite system may broadcast signals to the mobile vehicle that command the wireless communication device to call a telematics call center to initialize over-the-air service provisioning. Thus, the mobile vehicle will be able to access telematics services before the wireless telephony service provider has assigned and provisioned a MIN number, at which time the mobile phone may be located in a suitable area to be configured with OTASP, and telematics services may be accessed through the traditional networking of the wireless telephony service provider, landline networks and telematics service call center.

In the preferred embodiment, telematics unit initiates a call from the in-vehicle mobile phone to a telematics service call center in response to the downloaded information in a broadcast signal. In an alternative embodiment where the mobile phone and radio satellite receiver are electronically coupled with no intervening telematics unit, the mobile phone may place a call to a phone number of the wireless communication carrier or any other prescribed phone number to verify the activation of the phone.

When the telematics unit has placed a call to the telematics service call center, the telematics service center may respond to a service request from the mobile vehicle and send back a signal to provide the requested service such as unlocking doors, honking a horn, providing navigational assistance, and other vehicle services.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of activating an in-vehicle wireless communication device, comprising:
   receiving a broadcast signal containing a mobile identification number associated with the wireless communication device and a satellite radio subscriber identifier at an in-vehicle satellite radio receiver;
   storing the mobile identification number in the wireless communication device based on the satellite radio subscriber identifier;
   receiving a wireless communication parameter selected from the group consisting of a home system identifier, a mobile identification number, a call number, a preferred roaming list, a preferred roaming list flag, a configuration flag, and a configuration parameter; and
   storing the wireless communication parameter in the wireless communication device.

2. The method of claim 1 wherein the mobile identification number is provided by one of a wireless service provider or a telematics call center bases on a number selected from the group consisting of an electronic serial number associated with the wireless communication device, an electronic serial number associated with a telematics unit containing the wireless communication device, or a vehicle identification number associated with the mobile vehicle.

3. The method of claim 1 wherein the broadcast signal is received at the mobile vehicle from one of geostationary satellite or a terrestrial radio transmitter of a satellite radio service.

4. The method of claim 1 further comprising:
   sending the mobile identification number and the satellite radio subscriber identifier to a satellite radio service provider; and
   uplinking the mobile identification number and the satellite radio subscriber identifier to one of a geostationary satellite or terrestrial radio transmitter of the satellite radio service provider.

5. The method of claim 1 further comprising:
   receiving an activation flag; and
   transmitting a wireless communication parameter using one of an over-the-air service protocol or an air interface function bases on the activation flag.

6. The method of claim 1 further comprising;
   placing a wireless call to one of a wireless service provider or a call center to verify activation of the wireless communication device.

7. The method of claim 1 further comprising activating the in-vehicle wireless communication device based on the received broadcast signal.

8. The method of claim 1 wherein storing the mobile identification number in the wireless communication device based on the satellite radio subscriber identifier comprises storing the mobile identification number based solely on the satellite radio subscriber identifier.

9. A computer usable medium having thereon computer-readable instructions to activate an in-vehicle wireless communication device, comprising instructions for:
   receiving a broadcast signal containing a mobile identification number associated with the wireless communication device and a satellite radio subscriber identifier at an in-vehicle satellite radio receiver;
   storing the mobile identification number in the wireless communication device based on the satellite radio subscriber identifier;
   receiving a wireless communication parameter selected from the group consisting of a home system identifier, a mobile identification number, a call number, a preferred roaming list, a preferred roaming list flag, a configuration flag, and a configuration parameter; and
   storing the wireless communication parameter in the wireless communication device.

10. The computer usable medium of claim 9 further comprising instructions for:
    providing the mobile identification number associated with the wireless communication device.

11. The computer usable medium of claim 9 further comprising instructions for:
    sending the mobile identification number and the satellite radio subscriber identifier to a satellite radio service provider; and
    uploading the mobile identification number and the satellite radio subscriber identifier to one of a geostationary satellite or a terrestrial radio transmitter of the satellite radio service provider.

12. The computer usable medium of claim 9 further comprising instructions for:
    receiving a wireless communication parameter; and
    storing the wireless communication parameter in the wireless communication device.

13. The computer usable medium of claim 9 further comprising instructions for:
    receiving an activation flag; and computer program code to transmit a wireless communication parameter using one of an over-the-air service protocol or an air interface function based on the activation flag.

14. The computer usable medium of claim 9 further comprising instructions for:
    placing a wireless call to one of a wireless service provider or a call center to verify activation of the wireless communication device.

15. The medium of claim 9 further comprising computer readable code for activating the in-vehicle wireless communication device based on the received broadcast signal.

16. A system for activating an in-vehicle wireless communication device, comprising:
    means for receiving a broadcast signal containing a mobile identification number associated with the wireless communication device and a satellite radio subscriber identifier at an in-vehicle satellite radio receiver; and
    means for storing the mobile identification number in the wireless communication device based on the satellite radio subscriber identifier;
    means for receiving a wireless communication parameter selected from the group consisting of a home system identifier, a mobile identification number, a call number, a preferred roaming list, a preferred roaming list flag, a configuration flag, and a configuration parameter; and
    means for storing the wireless communication parameter in the wireless communication device.

17. The system of claim 16 further comprising:
means for providing the mobile identification number associated with the wireless communication device.

18. The system of claim 16 further comprising:
means for sending the mobile identification number and the satellite radio subscriber identifier to a satellite radio service provider; and
means for uplinking the mobile identification number and the satellite radio subscriber identifier to one of a geostationary satellite or a terrestrial radio transmitter of the satellite radio service provider.

19. The system of claim 16 further comprising:
means for receiving an activation flag; and
means for transmitting a wireless communication parameter using one of an over-the-air service protocol or an air interlace function based on the activation.

20. The system of claim 16 further comprising:
means for placing a wireless call to one of a wireless service provider or a call center to verify activation of the wireless communication device.

21. The system of claim 16 further comprising means for activating the in-vehicle wireless communication device based on the received broadcast signal.

* * * * *